US010942795B1

(12) United States Patent
Yanacek et al.

(10) Patent No.: US 10,942,795 B1
(45) Date of Patent: Mar. 9, 2021

(54) SERVERLESS CALL DISTRIBUTION TO UTILIZE RESERVED CAPACITY WITHOUT INHIBITING SCALING

(71) Applicant: Amazon Technologies, Inc., Seattle, WA (US)

(72) Inventors: David Yanacek, Seattle, WA (US); Sean Tyler Myers, Seattle, WA (US); Yogesh Aggarwal, Issaquah, WA (US); Naveen Dasa Subramanyam, Seattle, WA (US); Amit Raghunath Kulkarni, Bellevue, WA (US); Aritra Bandyopadhyay, Seattle, WA (US); Jianwei Cui, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/698,829

(22) Filed: Nov. 27, 2019

(51) Int. Cl.
*G06F 9/54* (2006.01)
*G06F 16/22* (2019.01)

(52) U.S. Cl.
CPC .......... *G06F 9/547* (2013.01); *G06F 16/2255* (2019.01)

(58) Field of Classification Search
CPC ............................ G06F 9/547; G06F 16/2255
See application file for complete search history.

(56) References Cited

U.S. PATENT DOCUMENTS

| 4,949,254 A | 8/1990 | Shorter |
| 5,283,888 A | 2/1994 | Dao et al. |
| 5,970,488 A | 10/1999 | Crowe et al. |

(Continued)

FOREIGN PATENT DOCUMENTS

| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Doon Y Chow
*Assistant Examiner* — Carina Yun
(74) *Attorney, Agent, or Firm* — Knobbe, Martens, Olson & Bear, LLP

(57) ABSTRACT

Systems and methods are described for reducing cold starts code within a serverless code execution system by providing a set of environments reserved for the code. A frontend utilizes a consistent hash ring to distribute calls for execution among a set of manager devices that manage environments in the system, distributed in a manner that groups calls together and attempts to distribute calls of the same group to a stable subset of the manager devices. Each group is assigned an arc, representing a subset of manager devices. When a call is received to execute a set of code that has environments reserved, the frontend distributes the call to a manager device of a reserved arc. When a call is received to execute a set of code that does not have environment reserved, the frontend distributes the call to an arc associated with an arc for unreserved executions.

20 Claims, 7 Drawing Sheets

(56) References Cited

U.S. PATENT DOCUMENTS

| | | |
|---|---|---|
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |

(56) References Cited

U.S. PATENT DOCUMENTS

| | | |
|---|---|---|
| 10,592,269 B2 | 3/2020 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0192082 A1 | 8/2007 | Gaos et al. |
| 2007/0199000 A1 | 8/2007 | Shekhel et al. |
| 2007/0220009 A1 | 9/2007 | Morris et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |

(56) References Cited

U.S. PATENT DOCUMENTS

| | | |
|---|---|---|
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0311650 A1 | 11/2013 | Brandwine et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067830 A1 | 3/2015 | Johansson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0134626 A1 | 5/2015 | Theimer et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378554 A1 | 12/2016 | Gummaraju et al. |
| 2017/0041309 A1 | 2/2017 | Ekambaram et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |

(56) References Cited

U.S. PATENT DOCUMENTS

| | | |
|---|---|---|
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0230499 A1 | 8/2017 | Mumick et al. |
| 2017/0272462 A1 | 9/2017 | Kraemer et al. |
| 2017/0286143 A1 | 10/2017 | Wagner et al. |
| 2017/0371724 A1 | 12/2017 | Wagner et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0060318 A1* | 3/2018 | Yang .................. G06F 16/2255 |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0275987 A1 | 9/2018 | Vandeputte |
| 2018/0309819 A1 | 10/2018 | Thompson |
| 2019/0072529 A1 | 3/2019 | Andrawes et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0196884 A1 | 6/2019 | Wagner |
| 2019/0227849 A1 | 7/2019 | Wisniewski et al. |
| 2019/0384647 A1 | 12/2019 | Reque et al. |
| 2020/0057680 A1 | 2/2020 | Marriner et al. |

FOREIGN PATENT DOCUMENTS

| | | | |
|---|---|---|---|
| JP | 2006-107599 A | 4/2006 | |
| JP | 2007-538323 A | 12/2007 | |
| JP | 2010-026562 A | 2/2010 | |
| JP | 2011-233146 A | 11/2011 | |
| JP | 2011257847 A | 12/2011 | |
| JP | 2013-156996 A | 8/2013 | |
| JP | 2014-525624 A | 9/2014 | |
| JP | 2017-534107 A | 11/2017 | |
| JP | 2017-534967 A | 11/2017 | |
| JP | 2018-503896 A | 2/2018 | |
| JP | 2018-512087 A | 5/2018 | |
| JP | 2018-536213 A | 12/2018 | |
| WO | WO 2008/114454 A1 | 9/2008 | |
| WO | WO 2009/137567 A1 | 11/2009 | |
| WO | WO 2012/050772 A1 | 4/2012 | |
| WO | WO 2013/106257 A1 | 7/2013 | |
| WO | WO 2015/078394 A1 | 6/2015 | |
| WO | WO 2015/108539 A1 | 7/2015 | |
| WO | WO 2016/053950 A1 | 4/2016 | |
| WO | WO 2016/053968 A1 | 4/2016 | |
| WO | WO 2016/053973 A1 | 4/2016 | |
| WO | WO 2016/090292 A1 | 6/2016 | |
| WO | WO 2016/126731 A1 | 8/2016 | |
| WO | WO 2016/164633 A1 | 10/2016 | |
| WO | WO 2016/164638 A1 | 10/2016 | |
| WO | WO 2017/059248 A1 | 4/2017 | |
| WO | WO 2017/112526 A1 | 6/2017 | |
| WO | WO 2017/172440 A1 | 10/2017 | |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL: http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from https://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Han et al., Lightweight Resource Scaling for Cloud Applications, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

Kamga et al., Extended scheduler for efficient frequency scaling in virtualized systems, Jul. 2012, 8 pages.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Sakamoto, et al. "Platform for Web Services using Proxy Server"; Research Report from Information Processing Society, Mar. 22, 2002, vol. 2002, No. 31.

Shim (computing), Wikipedia, https://en.wikipedia.org/w/index.php?title+Shim_(computing)&oldid+654971528, [retrieved on May 26, 2016], 2 pages.

Stack Overflow, Creating a database connection pool, 2009, 4 pages.

(56) References Cited

OTHER PUBLICATIONS

Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
U.S. Appl. No. 16/698,845, Serverless Call Distribution to Implement Spillover While Avoiding Cold Starts, filed Nov. 27, 2019.

* cited by examiner

SERVERLESS CALL DISTRIBUTION TO UTILIZE RESERVED CAPACITY WITHOUT INHIBITING SCALING

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
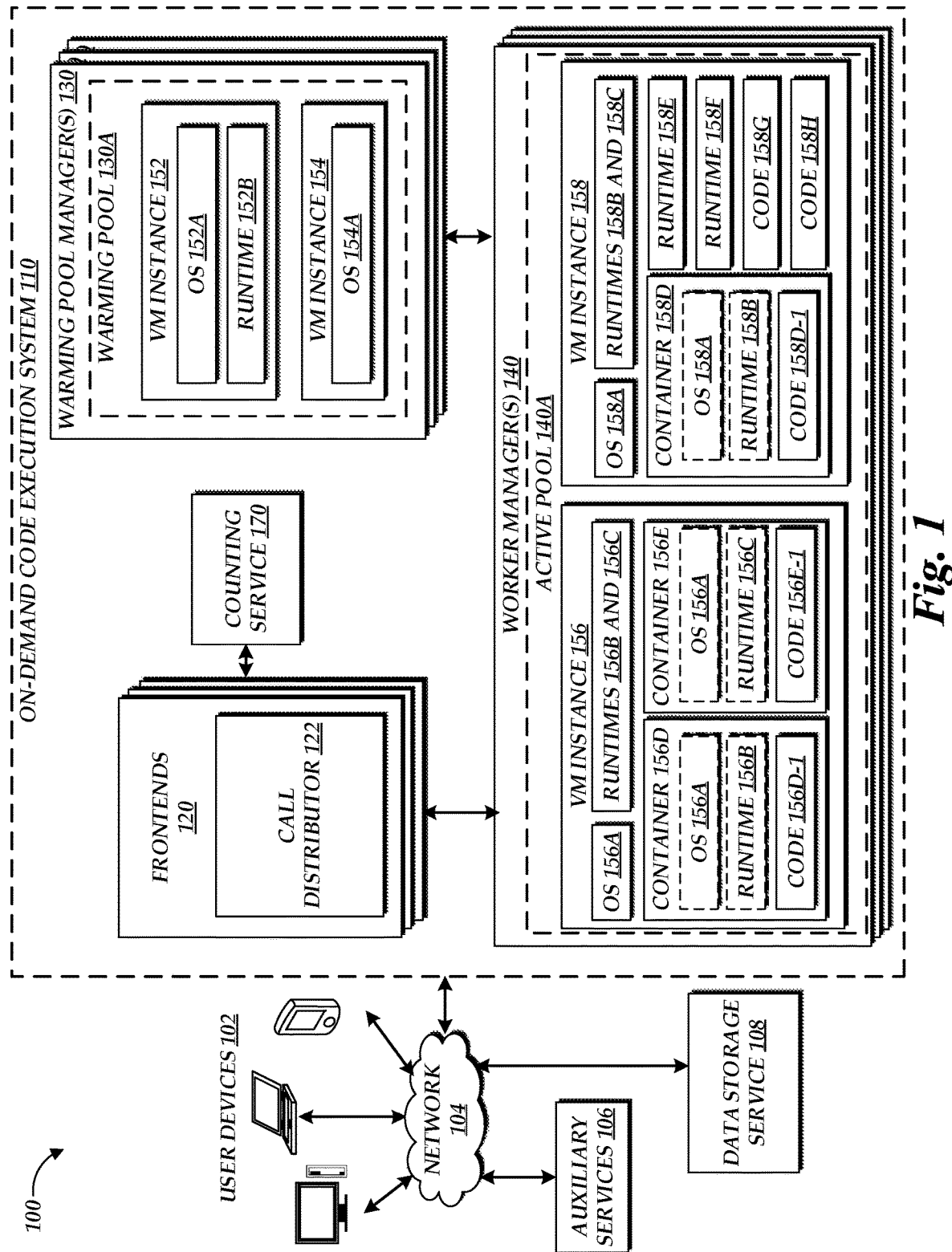
FIG. 1 is a block diagram depicting an illustrative environment in which an on-demand code execution system can operate to distribute calls to execute tasks, including both calls associated with reserved capacity and calls not associated with reserved capacity, while not inhibiting scalability of such calls on the system and while avoiding cold starts.

Generally described, aspects of the present disclosure relate to managing task executions on an on-demand code execution system, which may also be referred to as a "serverless" execution system, in order to reduce execution times by increasing a probability that an execution is distributed to a host computing device with an execution environment pre-configured to handle that execution. Specifically, and as described in more detail below, embodiments of the present disclosure address the "cold start" problem in serverless computing by providing reserved, pre-warmed capacity in a serverless system that can be used to service calls to a specific set of code (a "task"). Moreover, the present disclosure provides a variety of routing mechanisms enabling a frontend of a serverless system to route calls within the system in a manner that increases the chances that the call is routed to a "warm" (e.g., pre-provisioned) environment, even in cases where reserved capacity for a task is exceeded.

As described herein, an on-demand code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The on-demand code execution system can then enable the user to submit "calls" to execute that script, at which point the system will securely execute the script to provide the desired functionality. Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

To facilitate rapid on-demand code execution, the system can maintain a variety of execution environments (e.g., virtual machine instances, software containers, etc.) pre-provisioned with software, such as an operating system, code libraries and the like, used during execution of code. When a request to execute code is received, the system can attempt to route the request to such a pre-provisioned environment, enabling the code to execute within the environment quickly, without delay caused by provisioning the environment with software necessary to execute code. However, due to the wide variety of code that the system might support, a pre-provisioned environment may not always be available. Moreover, given the distributed nature of the system, even if a pre-provisioned environment did exist, it may be a non-trivial task to locate that environment within a reasonable time (e.g., in less time than it would take to simply provision an environment anew). When a pre-provisioned environment cannot be located, a call to execute code can be delayed while an environment is provisioned with necessary software. This delay is sometimes referred to as a "cold start," since no "warm" (e.g., pre-provisioned) environment was located for the call. Cold starts can add significant latency to calls to execute a task, and in some cases can inhibit adoption of the on-demand code execution system.

In some instances, the on-demand code execution system provisions environments based on past usage. For example, the first time a set of code representing a task is called, the call might result in a cold start. However, after execution of the code, the system may maintain the now-provisioned environment for a given period of time (e.g., 5 minutes). If another call to the task is received within that period, the system may attempt to route the call to the now-warm environment, avoiding cold starts. Thus, "steady state" traffic to the system (e.g., where a number of calls per second is relatively steady) may reduce the problem of cold starts. However, non-steady traffic may be more susceptible to cold starts. While the system may implement a variety of predictive techniques to attempt to pre-provision environments to handle non-steady traffic, in some cases users require a reduction in cold starts that cannot be guaranteed based on such predictive techniques.

To address this problem, embodiments of the present disclosure enable the use of reserved capacity on the on-demand code execution system, representing a set of execution environments that are maintained in a pre-provisioned state for code of a given task. For example, a user may require that the on-demand code execution system handle at least 500 concurrent executions of a task and the system may therefore maintain at least 500 execution environments pre-provisioned with software required by the code of the task, regardless of the actual number of calls to execute the task received at the system. It could therefore be expected that no cold starts would occur when the number of concurrent executions of the task does not exceed 500. However, to support many executions of many different tasks, the on-demand code execution system can generally operate in a distributed manner, such that many devices act cooperatively to implement each function of the system. For example, a "frontend" of the system, to which calls to execute a task are addressed, may in fact be implemented by a variety of different frontend devices. As is common in distributed systems, it may be impossible or impractical for each frontend to maintain perfect and up-to-date information on the state. Moreover, a number of different sets of reserved capacity may exist for different functions or different customers, and each set of reserved capacity may be distributed across a number of host devices. Still further, each frontend may be expected to handle not only calls for execution of tasks with reserved capacity, but also calls for execution of tasks without reserved capacity. It is therefore non-trivial to implement a routing mechanism that can be implemented largely independently at each frontend such that all calls to execute tasks—with or without reserved capacity—have a high probability of being routed to a pre-provisioned with software to execute code of the task.

Embodiments of the present disclosure provide a routing mechanism to achieve this goal. Specifically, as disclosed herein, execution environments of the on-demand code execution system can be managed by a distributed set of "worker managers," representing devices that manage a set of execution environments hosted by host devices ("workers"). Each of a distributed set of frontends may implement a consistent hash ring routing mechanism, which divides calls to execute tasks among the worker managers, such that each call is routed to an individual worker manager selected from the ring based on a hash value associated with the call. For example, with respect to general calls (e.g., for tasks without reserved capacity), an account identifier of a calling entity may be hashed into a position within a hash ring, and the call can be routed to a worker manager associated with that position. Because the capacity of an individual worker manager is typically limited, it may be undesirable for each frontend to route all calls from a given account to the same worker manager. Instead, the frontend may select a number of worker managers among which to distribute calls associated with the account, based on a number of desired concurrent executions for the account supported by the on-demand code executions system (which number may generally be referred to herein as a "throttle limit" for the account). For example, the system may be configured such that each worker manager supports 500 concurrent executions of tasks associated with a given account. Thus, where an account is configured to support a throttle limit of 2000 concurrent task executions, execution calls associated with the account can be divided among four worker managers, which may be the worker manager associated with a position in the hash ring corresponding to a hash of an account identifier, plus the three subsequent worker managers on the ring. Because these four worker managers occupy a subset of the entire hash ring, the set of worker managers associated with a given group of task calls (e.g., calls associated with a given account) can generally be referred to as an "arc" of the group of calls. Each frontend may implement the same arc-creation logic, and thus the arc of a group of calls can be expected to be the same across all frontends.

In some embodiments, throttle limits and associated account arcs may be configured to scale based on load associated with the arc. For example, at each period of a set of periods (e.g., every 5 minutes), a frontend may increment or decrement a throttle limit and associated account arc based on an average number concurrent executions for the arc over a past period. Accordingly, when the load on an arc reaches a threshold percentage of total capacity (e.g., 80% of arc capacity, such as 500 concurrent execution capacity represent by an arc-length of one worker manager), the frontend may increase the throttle limit by 500, and also increase the arc length by adding a worker manager to the arc, thus increasing capacity of the arc by the number of concurrent executions provided by that worker manager. When the load on an arc drops below a threshold capacity (e.g., 60% of arc capacity, represented for example as 1000 execution capacity represented by an arc-length of two worker managers), the frontend may decrease the throttle limit by 500 executions, and also decrease and the arc length by removing a worker manager to the arc, thus decreasing capacity of the arc by the number of concurrent executions provided by that worker manager. Accordingly, the size of throttle limit and an account arc may scale to account for load on the arc.

When a call associated with arc is received at a frontend, the frontend can then distribute the call to a worker manager selected among those within the arc. While a variety of load-balancing techniques can be used within an arc, in one embodiment each frontend implements a round robin selection to select a worker manager within the arc. Grouping calls of each account into per-account arcs can beneficially reduce the resources required to implement each frontend, when compared to maintaining arcs for each task. Moreover, use of per-account arcs can provide greater efficiency of the system, as in some cases grouping of task executions for an account at specific worker managers can increase efficiency of operation of such worker managers. For example, the system may be configured such that different task executions associated with a given account may be implement on the same virtual machine instance (e.g., as different containers on the instance), whereas task executions of different accounts may be required to execute on different virtual machine instances (to heighten security). However, per-account arcs may also reduce the chance that a call for a given task is routed to a worker manager that manages a warm environment for the task. For example, where an arc of an account includes four worker managers and two iterative calls to execute a task are made to a given frontend, round robin selection at the frontend might result in a first worker manager managing the first call and a second worker manager managing the second call. As such, the second call may experience a cold start.

In the case of tasks with reserved capacity, to enable consistent routing of calls to environments reserved for those tasks, each frontend can be configured to maintain a distinct arc for each task with reserved capacity. Specifically, each frontend may treat calls to a task with reserved capacity as a group of calls, and thus assign to the group an arc within a consistent hash ring (e.g., a set of n worker managers selected based on a hash value of a function identifier as a position within the ring). The set of worker managers within the arc is illustratively selected based on a number of reserved environments of the task. For example, if a worker manager is configured to handle no more than 500 environments for a given arc, and a user has requested 800 reserved environments, the arc size can be set to two, with each worker manager handling an equal portion (400) of the environments. Each worker manager within the arc can be configured with access to their respective portion of reserved environments, such that when each frontend routes calls to execute the task to one of the two worker managers, the worker manager can allocate the call to a reserved environment for the task, thus enabling execution of the task without incurrence of cold starts. Unlike account arcs, reserved capacity arcs are in some configurations statically sized, such that the arc begins and continues at a specific length corresponding to the total reserved capacity.

Similarly, a task associated with reserved capacity may be associated with a throttle limit distinct from an account's throttle limit. The reserved capacity throttle limit can be set equal to the current reserved capacity (e.g., 500 environments) without respect to current use of that capacity.

Accordingly, when a call is received at a frontend, the frontend may determine the appropriate arc of the consistent hash ring to utilize in routing the call (e.g., an account arc or, where reserved capacity exists, a reserved capacity arc). The frontend may then select a worker manager associated with that arc, and distribute the call to the worker manager. The worker manager can then locate an environment for the call (preferably, a pre-provisioned environment) and execute the called task within that environment. Because calls to tasks with reserved capacity are routed to worker managers that maintain reserved environments for those calls, the probability that such calls are routed to a manager with a pre-warmed environment is very high (and in some cases, may be 100%). Thus, the routing mechanisms described herein enable each frontend to accurately route calls associated with reserved capacity, without interfering with routing of other calls.

Another problem that may arise from use of reserved concurrency in an on-demand code execution system is that of executions exceeding reserved capacity. One benefit of on-demand code execution is scalability—because a user need not configure and manage their own devices, the system enables the user to scale operations, simply calling for as many concurrent task executions as the user may require. However, when a user reserves a specific number of environments, it can be desirable that the system also handles calls beyond that number of environments. That is, simply because a user has reserved 500 environments, it may be undesirable for the system to reject a $501^{st}$ call to execute a task. Moreover, it may generally be desirable that calls exceeding a throttle limit of reserved capacity are handled as would be other more general calls on the system, such as by being routed based on an account arc rather than a reserved capacity arc. Accordingly, each frontend in embodiments of the present disclosure can be configured to allow for handling of "spillover" calls—calls to a function with reserved capacity that would exceed that the throttle limit of the reserved capacity. Specifically, the on-demand code execution system may be provisioned with a "counting service" that enables each frontend to report executions associated with a specific throttle limit (e.g., a reserved capacity throttle limit or account throttle limit), and obtain a count of executions associated with that throttle limit across all frontends. When a frontend obtains a call to a task with reserved capacity that exceeds a throttle limit of that reserved capacity (e.g., a $501^{st}$ call to a task with 500 reserved environments), the frontend can be configured to handle such a call as a general call from the account, rather than a call to reserved capacity.

One potential side effect of handling calls that exceed reserved capacity in this manner is the potential for cold-starts of such spillover calls. For example, where a $501^{st}$ call to a task with 500 reserved environments is routed to a worker manager within a general arc, there is a substantial probability that this manager does not have an available pre-warmed environment for the call, and as such, the call may experience a cold start. While this may be acceptable in many situations (e.g., because the number of calls exceeds reserved capacity, and thus the user presumably accepts a possibility of cold starts), it is generally undesirable and in some instances can lead to unintuitive operation. For example, as discussed above, even without reserved capacity the on-demand code execution system can generally minimize cold starts under steady-state execution levels for a task, where the number of concurrent executions remains generally constant over time. Accordingly, if a user initially reserves capacity for a task but later recognizes that the task is experiencing steady-state execution levels, the user may attempt to reduce or revoke the reserved capacity (e.g., to reduce a cost of the user imposed by the system for reserved capacity, accounting for the computational costs required to maintain reserved capacity). However, where a frontend "spills over" calls that exceed reserved capacity to an account arc, reducing or revoking reserved capacity may cause all or a portion of those steady-state calls to spillover to the account arc and thus experience cold starts. This incurrence of cold starts due to reduction in reserved capacity under steady-state executions level represents undesirable operation. Moreover, these cold starts may in fact increase computational load of the system, as the cold starts require provisioning new environments on the account arc, despite the fact that pre-warmed environments exist on the reserved capacity arc.

To address this problem of cold starts due to reductions in reserved capacity, a frontend according to embodiments of the present disclosure may continue to route spillover calls to a reserved capacity arc so long as worker managers of that arc have warm (but not "hot," e.g., currently in use) environments for the task. Specifically, each frontend may be configured to maintain, for an arc, load information for the arc indicating a proportion of environments of the arc that are in use at a worker manager, compared to warm but not in-use environments. When the frontend receives a request for a task that would otherwise be handled as a spillover request (e.g., exceeding a throttle limit for reserved capacity), the frontend can instead be configured to route the task based on a reserved capacity arc, so long as the load of the arc falls under a given threshold (e.g., 95%, 99%, etc.). Moreover, worker managers on the arc (and potentially generally) can be configured to release warm environments into a pool of available resources when those environments are not utilized for a threshold period (e.g., 5 minutes). Thus, even when reserved capacity and a corresponding throttle limit are reduced, requests for a task with now-reduced reserved capacity will continue to be routed to the reserved capacity arc up to the capacity of that arc (as established prior to reduction of the reserved capacity). Under steady-state execution levels, that capacity will remain constant and available to service request. However, if a number of concurrent executions (a "concurrency level") for the task falls, worker managers of that arc may release pre-warmed environments thus causing a reduction in capacity of that arc. This configuration can enable "graceful" scale down of reserved capacity arcs, such that cold starts are not experience under steady-state concurrency levels.

The general operation of the on-demand code execution system will now be discussed. Specifically, the on-demand code execution system disclosed herein may enable users to create request-drive services, by submitting or designating computer-executable source code to be executed by virtual machine instances on the on-demand code execution system in response to user requests to access such services. Each set of code on the on-demand code execution system may define a "task," and implement specific functionality corresponding to that task when executed on a virtual machine instance of the on-demand code execution system (e.g., functionality of a network-based service). Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a call to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager (a "worker manager") configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GEN- ERATION FOR REQUESTS TO EXECUTE PROGRAM CODE" and filed Sep. 30, 2014 ("the '556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable source code (e.g., including metadata identifying dependency code objects for the uploaded code), invoking the user-provided source code (e.g., submitting a request to execute the source code on the on-demand code execution system 110), scheduling event-based jobs or timed jobs, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the on-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be invoked by code execution on the on-demand code execution system 110, such as by API calls to the auxiliary services 106. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as source code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontends 120 may be connected to the network 104, and other components of the on-demand code execution system 110 may communicate with other components of the environment 100 via the frontends 120.

In FIG. 1, users, by way of user computing devices 102, may interact with the on-demand code execution system 110 to provide source code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying).

To enable interaction with the on-demand code execution system 110, the system 110 includes multiple frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable source code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks," while specific executions of that code are referred to as "task executions" or simply "executions." Source code for a task may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the source code (or the location thereof) to be executed and one or more arguments to be used for executing the source code. For example, a call may provide the source code of a task along with the request to execute the task. In another example, a call may identify a previously uploaded task by its name or an identifier. In yet another example, source code corresponding to a task may be included in a call for the task, as well as being uploaded in a separate location (e.g., storage of an auxiliary service 106 or a storage system internal to the on-demand code execution system 110) prior to the request being received by the on-demand code execution system 110. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the source code and any libraries (and/or identifications of storage locations thereof) corresponding to the task requested for execution. In some embodiments, the call includes metadata that indicates the source code of the task to be executed, the language in which the source code is written, the user associated with the call, and/or the computing resources (e.g., memory, etc.) to be reserved for executing the source code. For example, the source code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code sets may also be associated with permissions or authorizations. For example, a third party may submit a code object and designate the object as readable by only a subset of users. The on-demand code execution system 110 may include functionality to enforce these permissions or authorizations with respect to code sets.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In accordance with embodiments of the present disclosure, each frontend illustratively includes a call distributor 122, which acts to identify a specific worker manager 140 to which to route a call to execute a task. Routines and interactions associated with the call distributor are described in more detail below; however, in brief, a call distributor 122 may distribute calls among worker managers 140 utilizing a consistent hash ring algorithm, in which calls are grouped into related sets (e.g., calls associated with an account, with reserved concurrency, etc.), and each set is associated with a group of worker managers 140 (an "arc") selected from a circular organization of such managers (the "hash ring"). For each call, the distributor 122 may identify an arc associated with the call, and then distribute the call to a worker manager of the arc (e.g., in a round robin fashion among such worker managers). In instances where spillover of a reserved capacity arc occurs, the distributor 122 may route the call based either on the reserved capacity arc or on the account arc, based on remaining capacity of the account arc, in order to avoid cold starts that may be otherwise associated with spillover.

To facilitate operation of the call distributor 122, the system 110 further includes a counting service 170, representing a distributed network-accessible service configured to maintain a count of current executions associated with each throttle limit on the on-demand code execution system 110 (e.g. a throttle limit of an account, of reserved capacity, etc.). Specifically, the counting service 170 may provide interfaces such as an API including "countUp" and "countDown" functions, callable by each distributor 122 to increment or decrement a count associated with a throttle limit (e.g., at receiving a call and completing execution of the called task, respectively). The service 170, in response to a countUp or countDown call, or in response to another function (such as a "getCount" function) may return to a calling distributor 122 a count of the throttle limit, aggregated across all distributors 122 of all frontends 120. To facilitate scaling, the counting service 170 may operate in a distributed manner, such as by a number of instances of the service 170 each corresponding to a computing device (physical or virtual on physical) configured to implement an instance of the service 170. The instances may communicate with one another in an attempt to unify counts across the instances, and may utilize a consensus protocol, such as a Paxos-family protocol, to provide a current count. Given the distributed nature of the service 170 and the potential frequency of calls to a given arc, it is contemplated that the count provided by the service 170 for a throttle limit may not always be perfectly accurate. However, it is notably that embodiments of the present disclose enable the call distributor 122 to operate without requiring perfect knowledge of a concurrency level for a given throttle limit.

To execute tasks, the on-demand code execution system 110 includes one or more warming pool managers 130, which "pre-warm" (e.g., initialize) virtual machine instances in an attempt to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls). While not shown in FIG. 1, each virtual machine instance is illustratively hosted on a physical host computing device, sometimes referred to herein as a "worker." The warming pool managers 130 and worker managers 140—each of which are also illustratively implemented as physical or virtual-on-physical devices—illustratively maintain state information regarding instances that they are currently managing, and can communicate with one another to alter management of an instance. For example, a worker manager 140 may communicate with a warming pool manager 130 to transfer management of an instance, such that the manager 140 can instruct the instance (on a worker) to execute code of a task. Thus, while instances are shown for illustrative purposes as being "on" the warming pool managers 130 or worker managers 140, these instances may not exist on the same physical device as the respective managers 130 and 140, and thus "transfer" of instances may not require relocation of the instance, but rather simply a change in the manager 130/140 that manages the instance.

The warming pool managers 130 can generally be configured to attempt to ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification). In instances where a worker manager 140 requests a specific configuration of virtual machine instance from a warming pool manager 130 but such a configuration is not available, the manager 130 may operate to generate and configure that instance, by selecting a host device to host the instance and provisioning the instance with software required for that configuration (e.g., software used during execution of a task).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.). Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential source code of a task may be written. For example, such languages may include Java, JavaScript, Python, Ruby, and the like. In some embodiments, the set of languages that the source code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the runtimes may also be user provided. A runtime—sometimes referred to as a runtime system—generally includes a set of software designed to support execution of source code written in a given computer language. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D) (e.g., a "warm" container), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the source code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the source code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the source code of the task is loaded on a container in the active pool 140 at the time the request is received; (2) the source code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 patent, incorporated by reference above (e.g., at FIG. 4 of the '556 patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In accordance with embodiments of the present disclosure, the warming pool managers 130 and worker managers 140 may collectively operate to ensure that, for a given task associated with reserved capacity, a number of execution environments (e.g., VM instances or containers on VM instances) provisioned for the task across managers 130 and 140 does not fall below the level of reserved capacity. These environments may thus be excluded from typical "tear down" policies of the managers 130 and 140, such that they are destroyed even when unused. Illustratively, the worker managers 130 may, on receiving a request for reserved capacity, create a required number of environments within the warming pool 130A, and may "vend" such environments to different worker managers 140 based on requests for the environments. When environments go unused at a given worker manager 140, the managers 140 "lease" on the environment may be expired, and the environment will revert to management by the set of warming pool managers 130. Thus, the managers 130 and 140 can ensure that an environment is available to service the first n requests for a task, where n is the reserved capacity of the task. In some instances, the number of environments maintained for a set of reserved capacity may exceed the reserved capacity by a minor amount (e.g., 1%, 5%, 10%, etc.). This may enable the system 110 to avoid cold starts that may otherwise occur (e.g., due to a difficulty of maintaining perfect state information in a distributed system) when a number of calls obtained is nearing the reserved capacity.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

While some functionalities are generally described herein with reference to an individual component of the on-demand code execution system 110, other components or a combination of components may additionally or alternatively implement such functionalities. For example, frontends 120 may operate in a peer-to-peer manner to provide functionality corresponding to the counting service 170, as opposed to including a distinct service 170.

Figure 2:
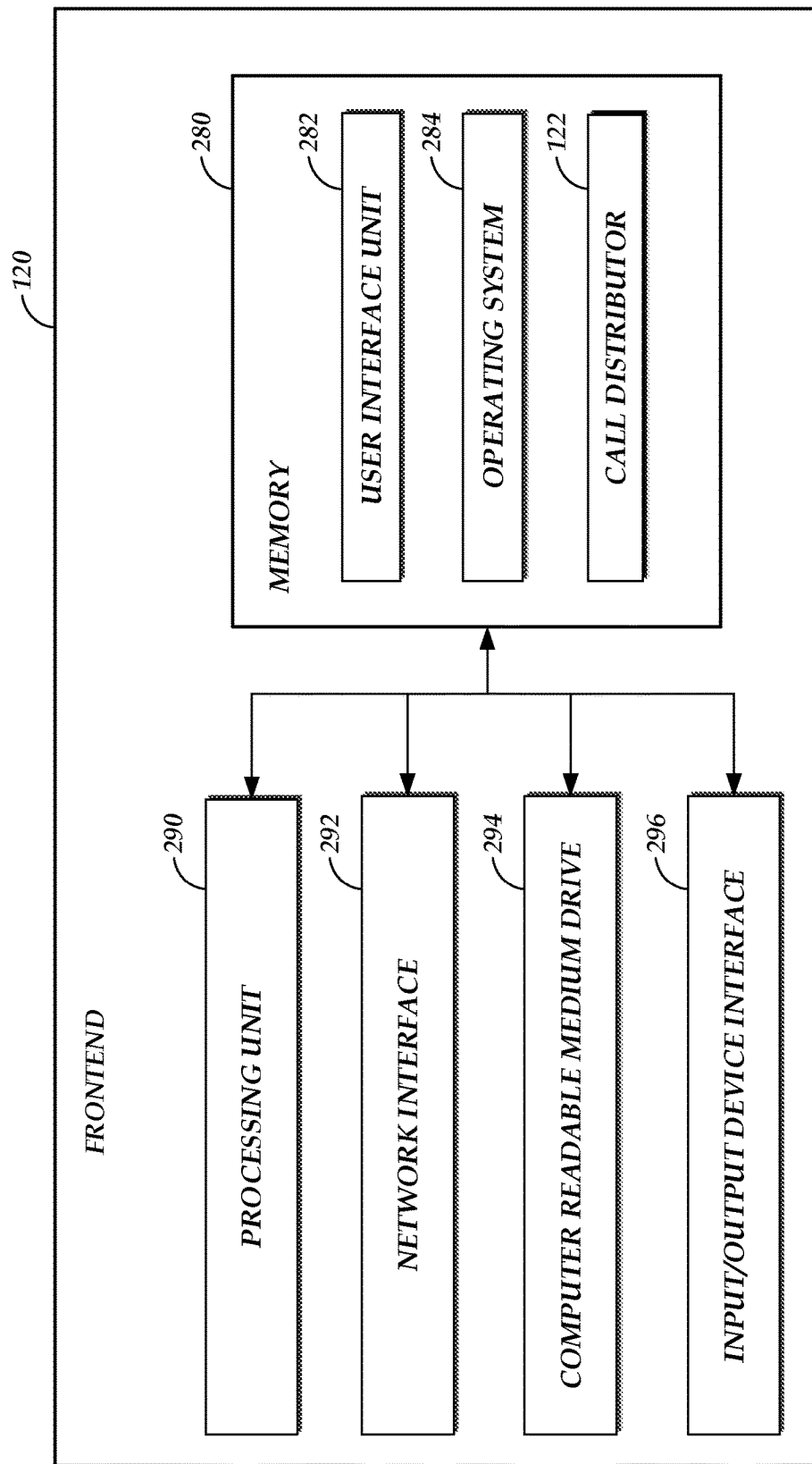
FIG. 2 depicts a general architecture of a computing device providing a frontend that is configured to facilitate distribution of calls to execute tasks on the on-demand code execution system of FIG. 1.

FIG. 2 depicts a general architecture of a computing system (referenced as frontend 120) that operates to facilitate cross-environment application of tracing information on the on-demand code execution system. The general architecture of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the code analysis system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a call distributor 122 that may be executed by the processing unit 290. In one embodiment, the call distributor 122 implements various aspects of the present disclosure (e.g., the routines of FIGS. 5 and 7).

In some embodiments, the frontend 120 may further include components other than those illustrated in FIG. 2. For example, the memory 280 may further include a user code execution unit to facilitate execution of tasks within the execution environments, a container manager for managing creation, preparation, and configuration of containers within virtual machine instances, etc.

Figure 3:
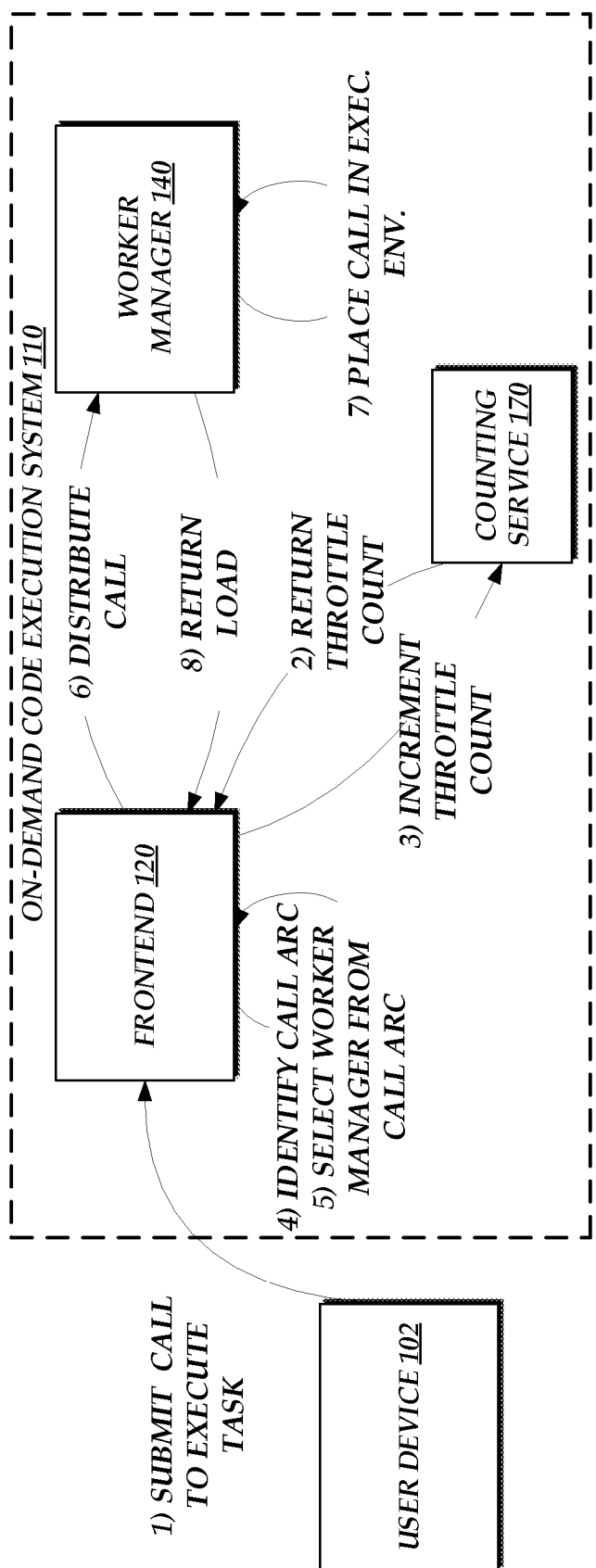
FIG. 3 is a flow diagram depicting illustrative interactions for distributing a call to execute a task on the on-demand code execution system of FIG. 1, including a determination of an arc to utilize in distributing the task based on whether the task is associated with reserved capacity.

With reference to FIG. 3, illustrative interactions are depicted for distributing a call to execute a task on the on-demand code execution system 110, including identification of an arc utilized to distribute the call and selection of a worker manager 140 of that arc to which to distribute the call. FIG. 3 will be described in conjunction with FIG. 4, which is an illustrative graphical depiction of consistent hash ring data structure 400 and associated arcs that may be maintained at each frontend 120.

The interactions of FIG. 3 begin at (1), where a user device 102 submits a call to the frontend 120 to execute the task. Submission of a request may include transmission of specialized data to the frontend 120, such as a HTTP packet or API call referencing the task. While the interactions of FIG. 3 are described as including an explicit request to execute the task by the user device 102, requests to execute the task may occur in a variety of manners, including submission of a call by auxiliary services 106 (not shown in FIG. 3A) or generation of a call by the on-demand code execution system 110 (e.g., based on a rule to call the alias when specific criteria are met, such as elapsing of a period of time or detection of data on an auxiliary service 106). The request may include any information required to execute the task, such as parameters for execution, authentication information under which to execute the task or to be used during execution of the task, etc. In some cases, the request may be a call to execute a task associated with reserved capacity. In other cases, the request may be a call to execute a task not associated with reserved capacity.

In some instances, a user may request reserved capacity for a task, but request that only some calls to the task utilize such reserved capacity. Accordingly, in one embodiment, the system 110 may enable creation of multiple "copies" of a task, each associated with a different identifier (or "alias"). Accordingly, calls to a first alias of a task may utilize reserved capacity, while calls to a second alias may not.

At (2), frontend 120 transmits a call to the counting service 170 to increment a count associated with a throttle limit for the currently called task. For example, where the call is to a task with reserved capacity, the frontend 120 can increment a count associated with a throttle limit for the reserved capacity. Where the call is not associated with reserved capacity, the frontend 120 can increment a count associated with a throttle limit for an account under which the call will be executed. The service 170, in response, returns a current count associated with that throttle limit to the frontend 120, at (3). For ease of description, it will be assumed that this count does not exceed the associated throttle limit. However, interactions for handling calls that exceed an associated throttle limit will be discussed in more detail below.

Figure 4:
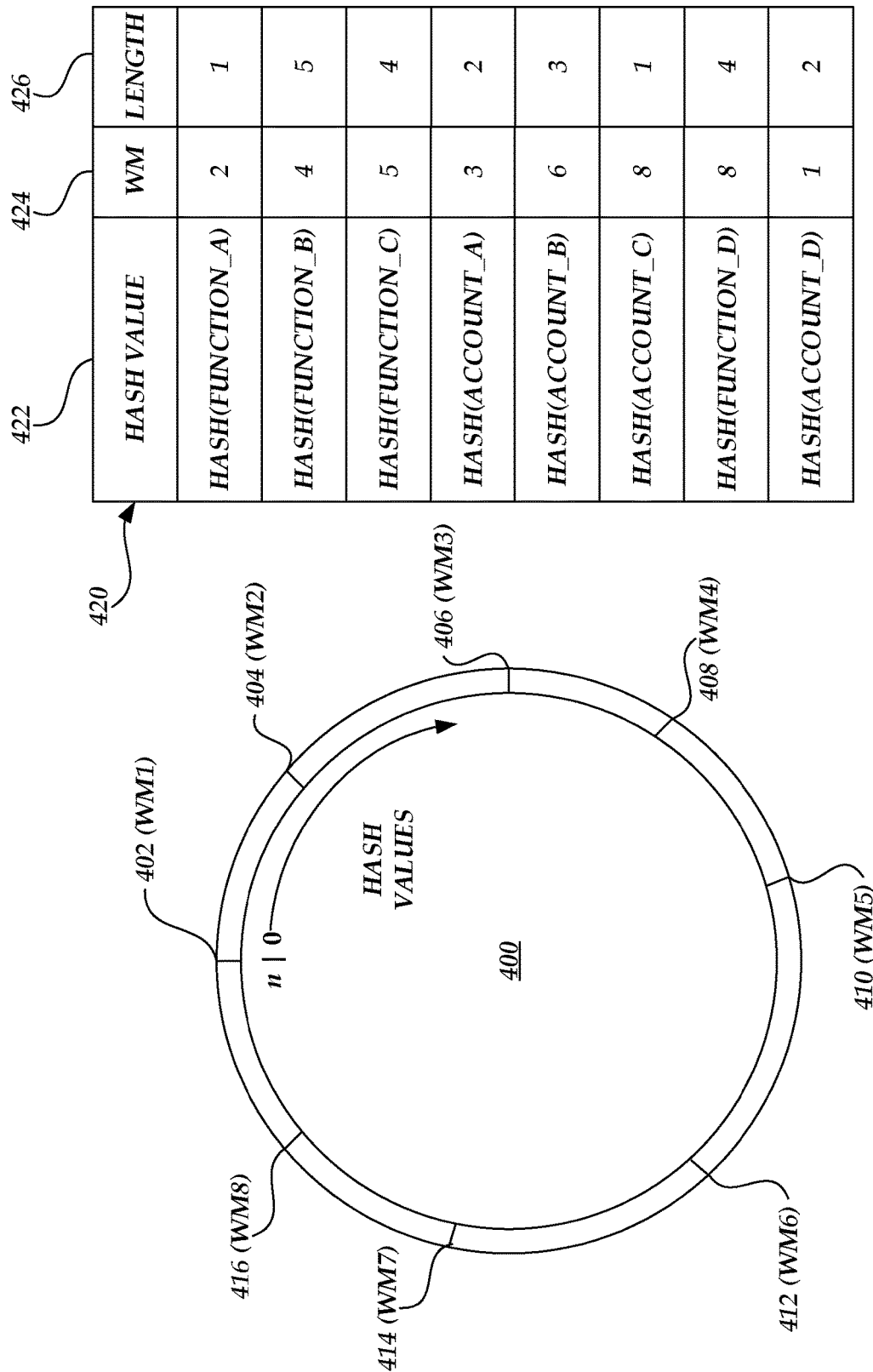
FIG. 4 is an illustrative graphical depiction of consistent hash ring and associated arcs that may be maintained at each frontend of the on-demand code execution system of FIG. 1.

Thereafter, at (4), frontend 120 identifies an arc of a consistent hash ring to utilize in routing the call. An example of such a ring is shown in FIG. 4 as ring 400. As shown in FIG. 4, the ring 400 represents a range of potential hash values, illustratively beginning with 0 and ending with n (which may represent an upper bound of potential hash values or any other value in a total range of potential values provided by a hash function). Each worker manager 140 of the system 110 (shown as "WMs" 1-8, though any number of managers 140 may be utilized) is associated with a position on the ring, corresponding to a hash value in the range represented by the ring. In accordance with utilization of the consistent hash ring 400, each group of calls obtained at a frontend 120 can be processed through a hash algorithm (a wide variety of which are known in the art) according to a partitioning key that identifies the group of calls. For example, a group of calls associated with an account may utilize an account identifier as the partitioning key, while a group of calls associated with a task (or task alias) may utilize a task identifier as the partitioning key. As a result of processing the key through the hash algorithm, the group is assigned a hash value that falls within the range of the ring 400. In some instances, where the range of the ring 400 is not equal to a total range of all potential values of the hash function, a frontend 120 may perform modulus division on the hash value provided by the hash function (e.g., hash value % n) to obtain a value in the range of the ring 400.

On obtaining a position within the ring 400, the frontend 120 can select an initial worker manager 140 to be associated with an arc of the call (the arc representing all worker managers 140 to which calls within a group of calls can be distributed). In one embodiment, the frontend 120 selects the worker manager 140 associated with first position of a manager 140 in the ring subsequent to the call's position on the ring (as set by the call's hash value). In other embodiment, the frontend 120 selects another the worker manager 140 in the ring based on the call's position on the ring (e.g., a first manager 140 prior to the call's position), though notably this could also be represented as a shift in position of managers 140 in the ring. For example, where a group of call's hash value (e.g., hash of an account identifier) falls between points 402 and 404, the group could be assigned an arc beginning with "WM2," an illustrative manager 140 associated with point 404. Similarly, where a group of call's hash value (e.g., hash of an account identifier) falls between points 404 and 406, the group could be assigned an arc beginning with "WM3," an illustrative manager 140 associated with point 406, etc. Because the hash values of each call group can be expected to be relatively random and distributed among the range 400, the initial worker manager 140 of each arc can also be expected to be evenly distributed across the managers 140. Moreover, the ring 400 enables consistent routing, such that calls within a given group consistently result in the same hash value. As a result, the likelihood that a call is routed to a manager 140 with an available warm environment increases relative to inconsistent routing, such as randomized routing.

As discussed above, in some instances each worker manager 140 can be configured with a threshold capacity for a given group of calls. For example, each manager 140 may be configured to have a capacity of 500 for each group of calls. Accordingly, where the supported concurrency (e.g., throttle limit) of group of calls exceeds the capacity of an individual manager 140, multiple managers may be assigned to the group of calls. Illustratively, the number of managers may be calculated as the supported concurrency divided by the concurrency capacity of an individual manager 140. In some instances, the supported concurrency may scale. For example, the system 110 may be configured to initially support up to 500 calls for a given group (e.g., an account identifier), and may scale up that supported concurrency over time (e.g., by increasing the supported concurrency by 500 calls for each 5 minute period that used concurrency exceeds a threshold percentage of supported concurrency). In other instances, supported concurrency may be static. For example, the supported concurrency for a group of calls corresponding to a task with reserved capacity may be set at the level of reserved capacity.

The set of worker managers 140 supporting calls within a given group illustratively represents an "arc" of that group, which may correspond to the initial manager 140 selected for the group based on a hash value of the group (as discussed above), as well as any additional worker managers 140 required to provide the supported concurrency. For example, if a given group had a supported concurrency of 1000 and each manager 140 had a capacity of 500 concurrent executions for the group, the arc length of the group would be 2. If the hash value of the group resulted in initial selection of WM5 in the ring 400 (e.g., because the value is located between points 408 and 410 on the ring), the arc of the group would consist of managers 140 WM5 and WM6. For groups without reserved capacity, it may be beneficial to maintain an arc at a shortest length possible to support the supported concurrency of the arc, as providing a larger arc may further distribute calls within the group and increase chances that a call lands on a manager 140 without an available warm environment. For groups with reserved capacity, the arc length may be set to the maximum of the reserved capacity, as each manager 140 within that arc can be expected to have available a reserved warm environment for the calls.

An illustrative table 420 of arcs is shown in FIG. 4, a copy of which may be maintained at each frontend 120. Specifically, as shown in FIG. 4, each arc may be associated with a hash value, such as a hash of a function identifier or account identifier. Each such hash value is associated with an initial worker manager 140 within the ring 400, based on a position of the hash value in the ring relative to the initial worker manager 140. Each arc is further associated with a length, representing a number of worker managers 140 required to provide the supported concurrency. Thus, the first entry within the table 420 indicates that for a given group of calls corresponding to "function_A," a frontend 120 should select a worker manager 140 from a group starting at WM2 and having an arc length of one (e.g., only WM2). The second entry within the table 420 indicates that for a group of calls corresponding to "function B," the frontend 120 should select a manager 140 from a group starting at WM4 and having a length of 5 (e.g., WM4-8). Similar entries are shown for various groups of calls, corresponding to functions or accounts. In one embodiment, each frontend 120 maintains information on all potential arcs of the system 110. In another embodiment, the frontends 120 may collectively maintain a supported concurrency for each group of calls, and when an individual frontend 120 first obtains a call within a group of calls, the frontend 120 may determine the supported concurrency for that group of calls and generate information identifying an arc for that group based on the supported concurrency.

Returning to FIG. 3, on obtaining a call to execute a task, the frontend 120, at (4), determines an arc of the ring 400 to use to distribute the call. In one embodiment, the frontend 120 utilizes an arc corresponding to the function, if the function is associated with reserved capacity, and otherwise utilizes an arc corresponding to an account of the function. Thus, a call to "function_A" of "account_A," for example, would utilize the arc represented by the first entry in the table 420, while a call to another function (e.g., "function_E") of that account would utilize the arc represented by the 4$^{th}$ entry in the table 420.

Thereafter, a (5), the frontend 120 selects a worker manager 140 associated with the arc to which to distribute the call. Illustratively, the frontend 120 may select the manager 140 from among those in the arc in a "round robin" fashion, selecting a next manager 140 in the arc relative to a manager 140 in the arc selected for a past call of the arc.

On selecting a manager 140, the frontend 120 then distributes the call to the manager 140, at (6). The manager 140, in turn, places the call in an execution environment (e.g., a virtual machine instance or container), such that the called task is executed in the environment. In addition, at (8), the manager 120 returns to the frontend 120 load information for the manager 140, which may be represented as a number of current executions associated with a given arc divided by a number of available environments for the arc managed by the worker manager 140. As discussed below, load information may thereafter be utilized by the frontend 120 to handle subsequent requests to the arc.

While the interactions of FIG. 3 generally discuss distribution of a call to a worker manager 140, the interactions between frontend 120 and manager 140 may in some cases differ. For example, rather than directly causing execution of a task in an environment, the manager 140 in some cases may identify the environment, and return identifying information of the environment to the frontend 120. The frontend 120, in turn, may transmit instructions to the identified environment to execute the task. Examples of such interactions are provided with respect to FIG. 6, discussed below.

Thus, in accordance with embodiments of the present disclosure, the interactions of FIG. 3 can enable a frontend 120 to distribute calls to execute a task in a manner that enables reserved capacity for some calls while not inhibiting distribution of calls without reserved capacity, and in a manner that provides a high probability that calls are routed to a manager 140 with a pre-warmed environment for the call.

Figure 5:
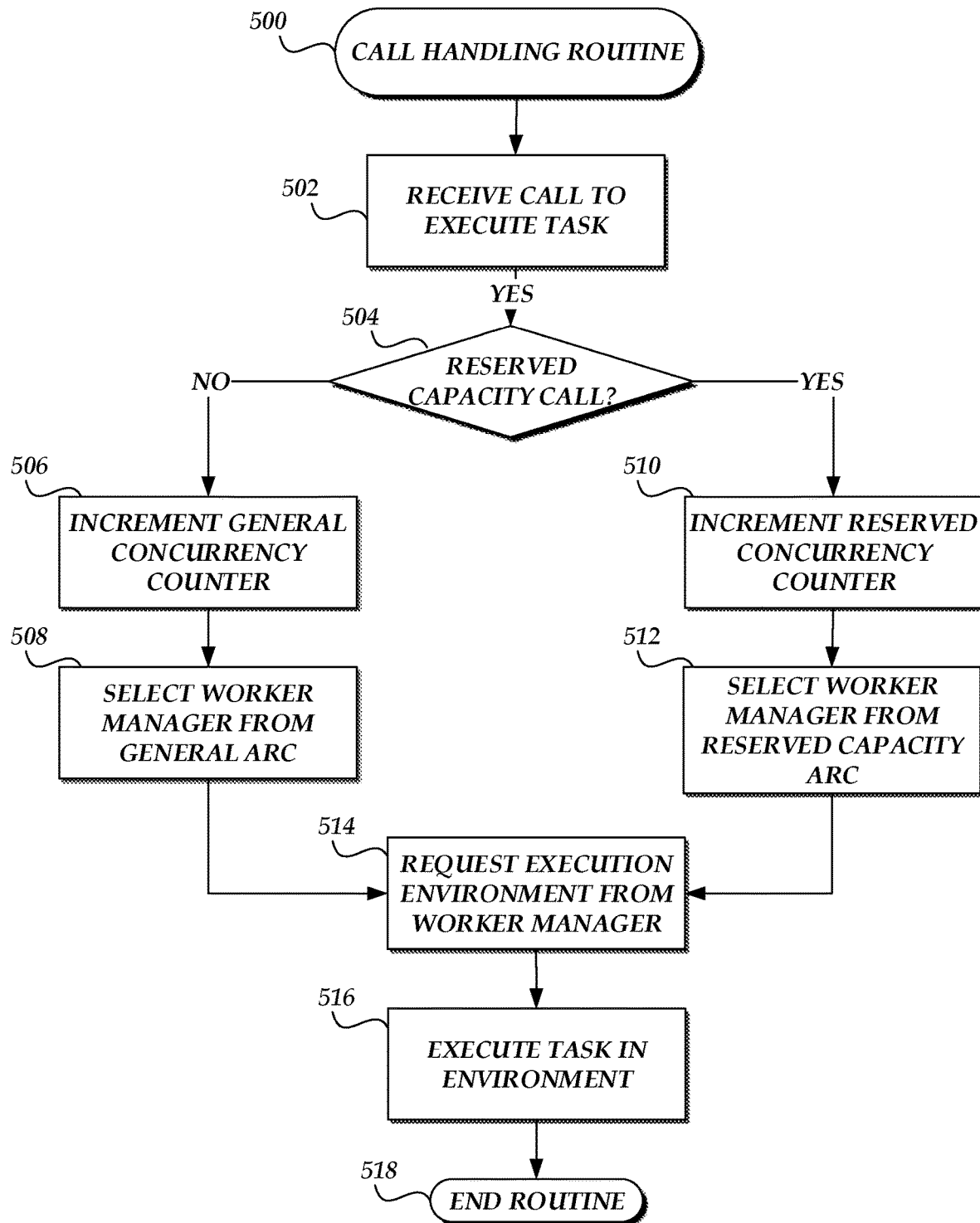
FIG. 5 is a flow chart depicting an illustrative routine for distributing calls, which may be implemented by a frontend of the on-demand code execution system of FIG. 1.

With reference to FIG. 5, an illustrative routine 500 for distributing calls within an on-demand code execution system will be described. The routine 500 may be implemented, for example, by a frontend 120 of FIG. 1.

The routine 500 begins at block 502, where the frontend 120 obtains a call to execute a task. As discussed above, the call may be transmitted by a user device 102 (e.g., as an API call), from another external device, generated at the frontend 120, etc.

At block 504, the frontend 120 determines whether the call is to a task with reserved capacity. In one embodiment, the frontend 120 may maintain information identifying an arc (e.g., within a table of such information) for each task with reserved concurrency. The frontend 120 may therefore determine whether the call is to a task with reserved capacity by inspecting such information. In another embodiment, each frontend 120 may maintain other information identifying tasks with reserved capacity, and may create information identifying the arc for the task in response to a first call for execution of the task. As discussed above, an arc for reserved capacity may illustratively be created with a static length, set based on the level of reserved capacity. An arc for non-reserved capacity (e.g., an account arc) may be scaled at the frontend 120 based on a load of that arc.

If the called task is not associated with reserved capacity, the routine 500 proceeds to block 506, where the frontend 120 increments a counter associated with a general (e.g., account) throttle limit. Illustratively, the frontend 120 may transmit a call to a counting service (e.g., the service 170) indicating an additional concurrent execution associated with the throttle limit. The routine 120 then proceeds to block 508, where the frontend 120 selects a worker manager 140 from a general (e.g., account) arc. As discussed above, selection of a manager 140 may include identifying managers 140 within the arc based on a hash value of an identifier for the arc (e.g., an account identifier) and based on an arc length, and then selecting among the managers 140 based on a load-balancing mechanism, such as round robin selection. As noted above, the frontend 120 may periodically (e.g., at every 5 minutes) increase or decrease a throttle limit and a length of the arc based on the number of concurrent executions associated with the throttle limit.

If the called task is associated with reserved capacity, the routine 500 proceeds to block 510, where the frontend 120 increments a counter associated with a reserved capacity throttle limit. Illustratively, the frontend 120 may transmit a call to a counting service (e.g., the service 170) indicating an additional concurrent execution associated with the throttle limit. The routine 120 then proceeds to block 512, where the frontend 120 selects a worker manager 140 from a reserved capacity arc. As discussed above, selection of a manager 140 may include identifying managers 140 within the arc based on a hash value of an identifier for the arc (e.g., an account identifier) and based on an arc length (e.g., established based on the reserved capacity), and then selecting among the managers 140 based on a load-balancing mechanism, such as round robin selection.

While not shown in FIG. 5, at each instance of incrementing a throttle limit counter (e.g., blocks 506 and 510), the frontend 120 may obtain a current count associated with that throttle limit. In the case that a current count for a general throttle limit exceeds that throttle limit, the frontend 120 may return an error in response to the request. In the case that a current count associated with a reserved capacity throttle limit exceeds the reserved capacity throttle limit, the frontend 120 may treat the request as a spillover request. An alternative routine for implementing handling of spillover requests will be described with reference to FIG. 7, below.

In either instance, the routine 500 then proceeds to block 514, where the frontend 120 requests from the selected manager 140 an execution environment in which to execute the task. In the case of requesting an environment from the reserved arc, it is expected that the manager 140 has reserved a number of pre-warmed environments for the task, and thus returns such a pre-warmed environment. In this case of requesting an environment from the general arc, a pre-warmed environment may be available to the manager 140 (e.g., as previously managed by the manager 140 or as maintained in a warming pool 130A), in which case the pre-warmed environment is returned. In the case that no pre-warmed environment is available (e.g., at the manager 140 or within a warming pool 130A), the manager 140 may provision a new environment for the task. While not shown in FIG. 5, each manager 140 may also be configured to reject requests for an environment that would exceed a per-arc capacity of the manager 140 (e.g., where creating an environment would cause the manager to manage more than n environments for an arc). In the case of such a rejection, the frontend 120 may retry the request with an alternative worker manager 140 on the arc until an environment is located, or (if retries are unsuccessful), the routine 500 ends in an error.

At block 516, after obtaining an execution environment from a worker manager 140, the frontend 120 causes the called task to be executed within the environment. The routine 500 then ends at block 518. Thus, by execution of the routine 500, the frontend 120 is enabled to route calls to execute both tasks associated with reserved capacity and tasks not associated with reserved capacity, in a manner that enables load balancing among managers 140 while still providing distributing calls in a manner that increases the probability that a pre-warmed environment for the call can be located.

As discussed above, in some instances a frontend 120 may receive calls to a function associated with reserved capacity, with at least some of those calls exceeding the throttle limit for reserved capacity. Those calls that exceed the throttle limit for reserved capacity are generally referred to herein as "spillover" calls. In some instances, a frontend 120 can be configured to route such spillover calls utilizing a more general arc (e.g., an account arc) than an arc associated with reserved capacity. However, as discussed above, in some instances routing spillover calls utilizing a more general arc may result in cold starts even while concurrency of a task's executions remains steady. For example, reducing a level of reserved capacity (or eliminating reserved capacity entirely) while executions remain steady may result in some new calls (representing a portion of the steady execution rate) becoming spillover calls. If such calls are routed to a more general arc, those calls may incur cold start delays, and additionally cause the system 110 to incur greater resource usage, as managers 140 associated with the reserved capacity arc may still be managing environments previously used to support the reserved capacity arc.

Figure 6:
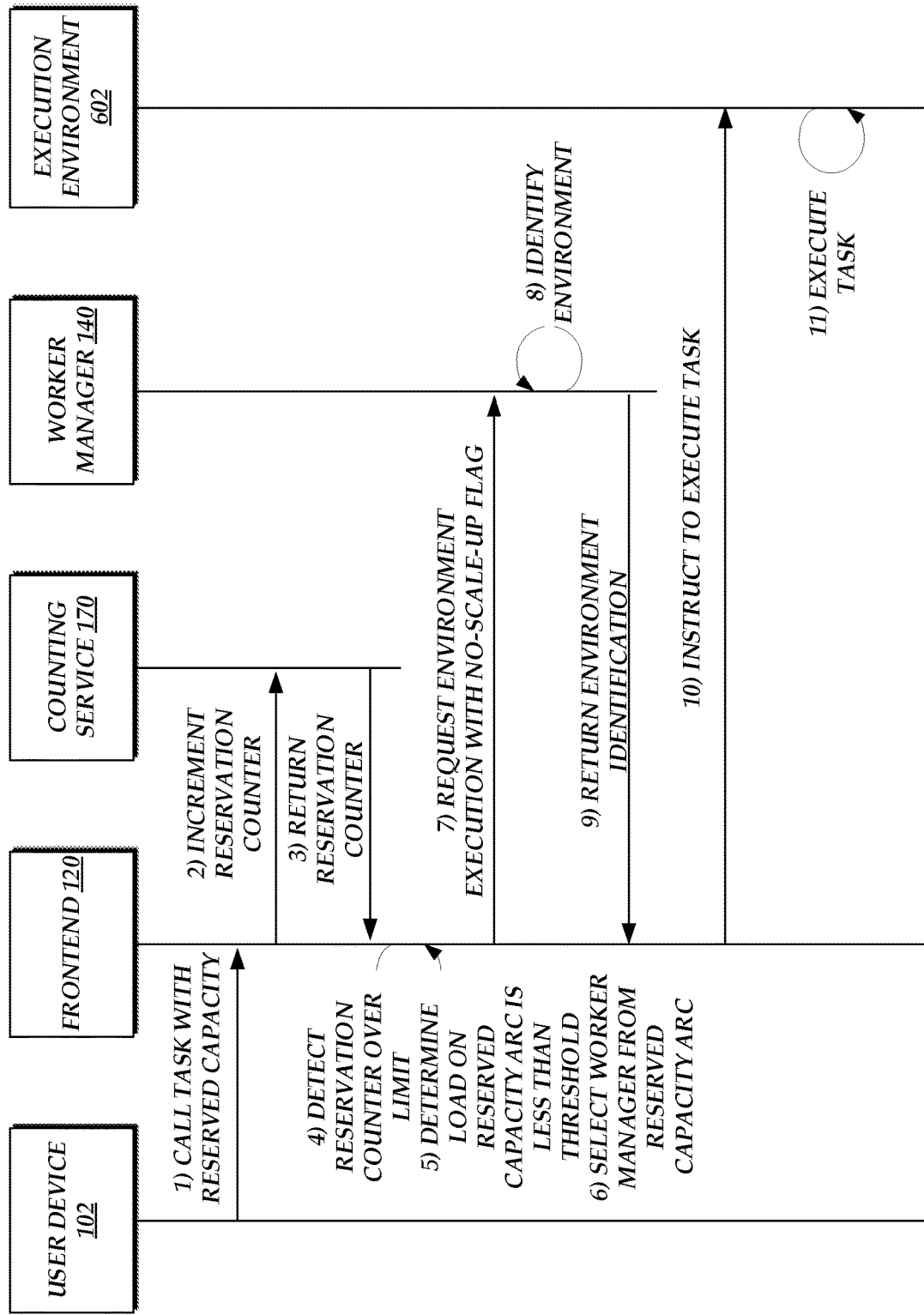
FIG. 6 is a flow diagram depicting illustrative interactions for handling spillover of calls to execute a task on the on-demand code execution system of FIG. 1 that are associated with reserved capacity but exceed that capacity.

FIG. 6 depicts a set of interactions for addressing this problem, by enabling the frontend 120 to route calls in the case of reductions in reserved capacity while avoiding cold start delays. The interactions of FIG. 6 begin at (1), where a user device 102 transmits to the frontend 120 a call for execution of a task associated with reserved capacity, in a manner similar to interaction (1) of FIG. 3. However, for the purposes of illustration, it is assumed that the call of FIG. 6 requests concurrent execution of the task at a level that exceeds a throttle limit for reserved capacity of the task. For example, the call may represent a $501^{st}$ call to execute a task with a throttle limit of 500 executions, and a prior 500 executions of the task may still be occurring.

To detect that the call exceeds the reserved capacity of the task, the frontend 120 transmits, at (2), an instruction to the counting service 170 to increment a counter associated with a throttle limit for reserved capacity of the task. As discussed above, the service 170 may operate to monitor concurrent executions based on inputs from all frontends 120, and may thus maintain a count of concurrent executions across the system 110. In response to the call, the service 170 returns to the frontend 120 a count of the concurrent executions associated with the reserved capacity throttle limit, at (3). The frontend 120 can then, at (4), detect that the count of concurrent executions exceeds the reserved capacity throttle limit.

As discussed above, the frontend 120 can be configured such that when the count of concurrent executions exceeds reserved capacity throttle limit, a more general (e.g., an account) arc for the task is utilized. However, to guard against potential cold starts in instances of steady-state traffic due to a reduction in reserved capacity, the frontend 120 at (5), prior to switching to a more general arc, assesses a load on the reserved capacity arc. In one embodiment, the load on an arc is represented as an average load across all worker managers 140 in the arc, and the load of each worker manager 140 is represented as a number of in-use (e.g., "hot") environments associated with the arc divided by the total number of environments (e.g., "hot" or "warm") for the arc managed by the worker manager 140. Thus, in cases where reserved capacity has not changed and spillover calls are received, the load on the arc can be expected to exceed a threshold amount (e.g., 95%, 99%, etc.). Put in other terms, where a user request 500 reserved environments for a given task and transmits (in some sufficiently short period) 501 calls to execute the task, the $501^{st}$ call to execute the task can be expected to result in both (i) a counter for the reserved capacity exceeding the level of reserved capacity and (ii) the load on the arc nearing 100%.

However, when a level of reserved capacity has changed (e.g., been reduced), it is conceived that while the counter for the reserved capacity throttle limit may exceed the (now reduced) level of reserved capacity, the load on an arc may be significantly less than 100%. This low load can be expected, for example, because while a frontend may immediately recognize a user's reduced level of reserved capacity, each worker manager 140 can be configured to release environments based on their idleness. Accordingly, in instances where a level of reserved capacity has changed but a concurrency rate for the task has remained steady, the arc for the task can be expected to have sufficient capacity to continue to handle that steady rate of concurrent executions. For the purposes of illustration of FIG. 6, it will be assumed that this instance has occurred, and thus, at (5), the frontend 120 determines that the load on a reserved capacity arc is less than a threshold amount (which threshold may be set near to 100%, such as at 95% or 99%).

Accordingly, at (6), and even though the call exceeds a current reserved capacity throttle limit, the frontend 120 selects a worker manager 140 from the reserved capacity arc, in accordance with the selection mechanisms described above. While not shown in FIG. 6, even though the frontend 120 selects a worker manager 140 from the reserved capacity arc, the frontend 120 may interact with the counting service 170 to adjust a count for the reserved capacity throttle limit and a more general (e.g., account) throttle limit to reflect the call being handled as a spillover call. For example, the frontend 120 may call the counting service 170 to decrement a counter associated with the reserved capacity throttle limit and to increment a counter associated with the more general throttle limit used for spillover requests. While FIG. 6 assumes for illustration that the more general throttle limit is not exceeded, in cases where that more general throttle limit is exceeded, the frontend 120 may return an error to the user indicating a lack of capacity to handle the request. (Note that such lack may be temporary, such as in the case that the more general throttle limit is scaled based on historical concurrency levels associated with that throttle limit.)

In addition, at (7), the frontend 120 transmits a request to the selected worker manager 140 for an execution environment in which to execute the task. However, as opposed to other requests for environments sent from the frontend 120 to the worker manager 140, the frontend 120 may at (7) utilize a "no-scale-up" flag for the request. Illustratively, the manager 140 may be generally be configured such that if the manager 140 does not currently manage an appropriate environment for a call, the manager 140 retrieves such an environment from a warming pool manager 130. This adoption of an environment by the worker manager 140 can be referred to as "scaling up" the manager's environments. Because the worker manager 140 was selected from the reserved capacity arc on the expectation that that arc had idle capacity, it can generally be undesirable for that capacity to be increased due to scaling up. Accordingly, by use of a "no-scale-up" flag at interaction (7), the frontend 120 can request an environment from the manager 140 without potentially causing the manager 140 to increase its capacity.

For the purposes of description of FIG. 6, it will be assumed that the manager 140 currently manages a warm environment usable to execute the task. As such, at (8), the manager 140 identifies that environment (shown in FIG. 6 as environment 602) and, at (9) returns to the frontend 120 information identifying that environment 602. However, in the case that a manager 140 does not currently manage a warm environment (e.g., if a previously warm environment was released to a warming pool 130A due to idleness), the manager 140 may return an error to the frontend 120. In one configuration, the frontend 120 may attempt to retry placement of the call within the reserved capacity arc a threshold number of times (e.g., 1 retry, 2 retries, etc.), by selecting an alternative worker manager 140 from the arc and repeating the request of interaction (7). If each retried interaction (7) fails, the frontend 120 may then place the call within the more general arc (e.g., an account arc).

On receiving identifying information of the execution environment 602, the frontend can then, at (10), instruct the environment 602 to execute the called task. The environment 602, at (11), executes the task. Because the interactions of FIG. 6 assume that the environment 602 was identified from the excess capacity of the reserved capacity arc, the environment 602 illustratively represents a pre-warmed environment, and as such, the execution of the task can complete without incurring cold start latency. Notably, this avoidance of cold starts beneficially occurs even though the call represents a call in excess of reserved capacity for the task.

Figure 7:
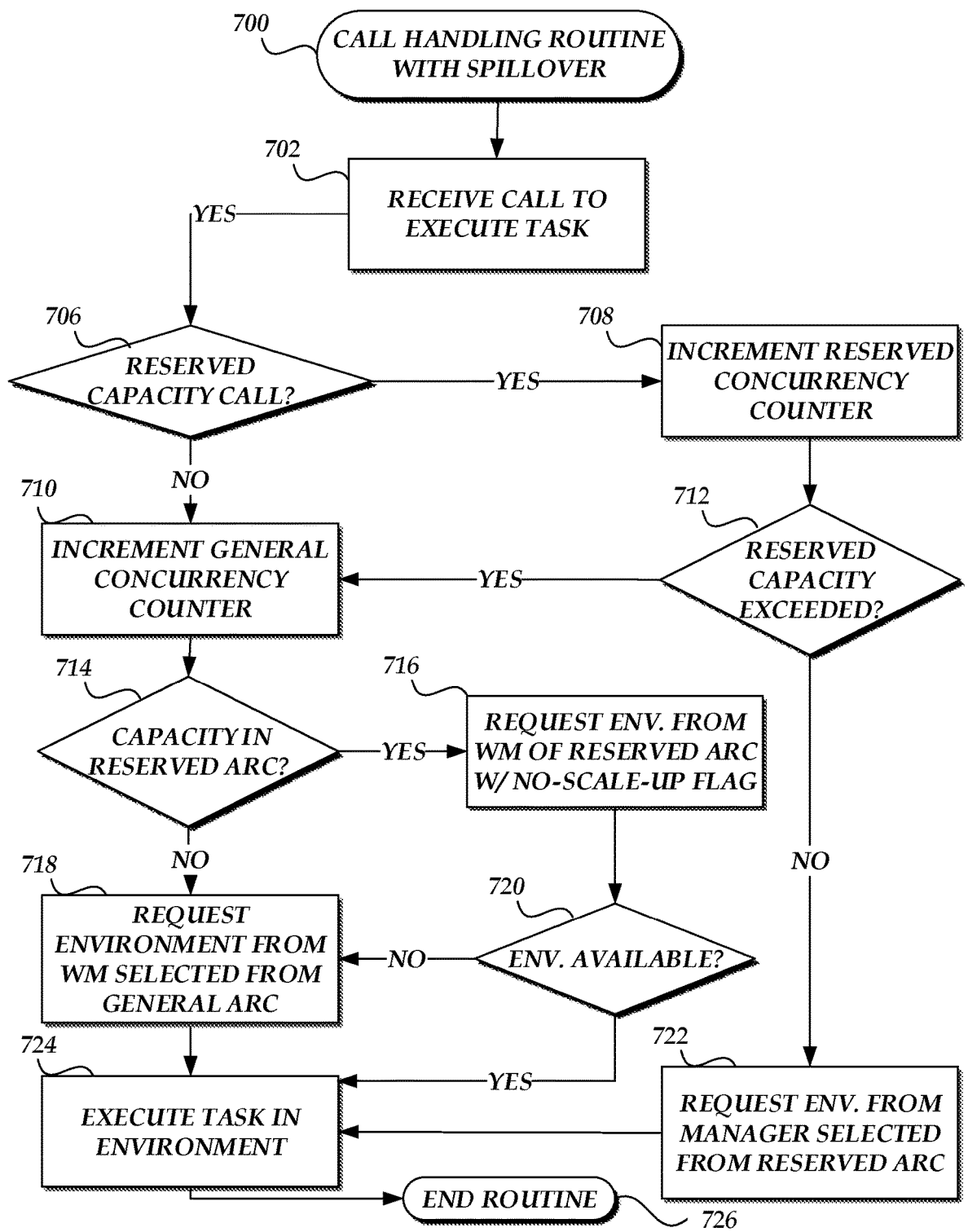
FIG. 7 is a flow chart depicting an illustrative routine for distributing calls that may be implemented by a frontend of the on-demand code execution system of FIG. 1, including elements for efficiently handling spillover of calls that are associated with reserved capacity but exceed that capacity.

With reference to FIG. 7, an illustrative routine 700 will be described for distributing calls within an on-demand code execution system, while handling spillover of calls to a task with reserved capacity. The routine 700 may be implemented, for example, by a frontend 120 of FIG. 1. The routine 700 can illustratively be viewed as a modification to the routine 500 of FIG. 5, and thus some elements of the routine 700 may be implemented in a manner similar to a corresponding element of the routine 500. For brevity, the description below focuses on modifications to the routine 500, and thus details previously discussed with respect to the routine 500 may be omitted. However, it should be understood that details discussed with respect to the routine 500 may also, unless stated below, apply to the routine 700.

The routine 700 begins at block 702, where the frontend 120 obtains a call to execute a task. Block 702 may be implemented similarly to block 502 of the routine 500. The routine 700 then proceeds to block 706, where the frontend 120 determines whether the call is associated with reserved capacity, and if so, increments a counter associated with either a reserved capacity throttle limit or a general (e.g., account) throttle limit, at blocks 708, and 710, respectively. Blocks 706-710 may be implemented in a manner similar to corresponding blocks within routine 500 (e.g., blocks 504, 510, and 506).

In contrast to the routine 500, the routine 700 includes, subsequent to incrementing a counter for a reserved concurrency throttle limit at block 708, a decision block 712. At block 712, the frontend 120 determines whether a count of concurrent executions associated with the reserved throttle limit excludes that throttle limit. Illustratively, the frontend 120 may obtain, in response to incrementing a counter associated with the throttle limit, a number of concurrent executions associated with throttle limit across the system 110. Implementation of decision block 712 may thus include comparing this number with the total throttle limit.

In the case that the reserved capacity throttle limit is not exceeded, the routine 700 proceeds to block 722, where the frontend 120 selects a worker manager from the reserved capacity arc, and requests an environment from that manager (similarly to blocks 512 and 514 of the routine 500). The routine 700 then proceeds to block 724, where the frontend 120 causes the environment to execute the task (similarly to block 516 of FIG. 5).

However, if at block 712 the count of calls associated with the reserved capacity throttle limit does exceed the throttle limit, the routine 700 instead proceeds to block 710, where the call is handled as a spillover call. As such, the frontend 120 increments, at block 710, a counter associated with the general throttle limit. While not shown in FIG. 7, the frontend 120 may further decrement the counter for the reserved capacity throttle limit, such that block 708 does not, in this case, cause an over counting of concurrent executions associated with the reserved concurrency throttle limit.

Thereafter, at block 714, the frontend 120 determines whether the load on a reserved capacity arc associated with the called task is below a threshold value, set equal to or near 100% (e.g., 95%, 99%, etc.). Notably, in the routine 700, block 714 is implemented in both cases where a call is associated with current reserved capacity (and that throttle limit of that reserved capacity is exceeded in terms of a concurrent execution count) and where a call is not associated with current reserved capacity. Typically, where a call is not associated with reserved capacity, it is expected that no reserved capacity arc for that task would exist. Where reserved capacity is exceeded, it may typically be expected that the load on the reserved capacity arc would exceed the threshold. In such cases, the routine 700 proceeds to block 718, where the frontend 120 requests an environment from a worker manager 140 selected from the general arc (similarly to blocks 506 and 508 of the routine 500). The routine

700 then proceeds to block 724, where the frontend 120 causes the environment to execute the task (similarly to block 516 of FIG. 5).

However, exceptions to these situations may exist, particularly where a task was previously associated with reserved capacity and that capacity is reduced or eliminated. In such an instance, a reserved capacity arc may exist and have a load under the threshold value, despite the fact that a call is not currently associated with reserved capacity (or reserved capacity is exceeded in terms of a concurrent execution count). Accordingly, if block 714 evaluates to true, the routine 700 proceeds to block 716, where the frontend 120 requests an environment from a worker manager 140 selected from the reserved capacity arc (e.g., selected as discussed above with respect to block 512 of FIG. 5). Specifically, at block 716, the frontend 120 submits a request to the manager 140 with a "no-scale-up" flag, indicating that the manager 140 should provide an environment only if a warm environment is presently managed by the manager 140, and that the manager 140 should not attempt to request such an environment from the warming pool 130A. Accordingly, the request of block 714 ensures that existing warm environments on the worker manager 140 associated with reserved capacity are utilized, but no new environments are adopted by the manager 140 (e.g., environments of the reserved arc are not "scaled up," given that the present call is either not associated with reserved capacity or exceeds limits of the reserved capacity).

At block 720, the routine 700 varies according to whether the manager 140 selected from the reserved capacity arc had an available environment in response to the request of block 716. If so, the routine 700 proceeds to block 724, where the frontend 120 causes the environment to execute the task (similarly to block 516 of FIG. 5). However, if the manager 140 did not have an environment available, the routine 700 proceeds to block 718 where an environment is requested from a manager 140 selected from the general arc (similarly to blocks 506 and 508 of the routine 500). Because the request of block 718 is not submitted with the no-scale-up flag, it is expected that the chances of successfully obtaining an environment from the manager 140 is increased. Note that while FIG. 7 depicts failover to the general arc after a single request to a manager 140 of the reserved arc, in some instances a negative evaluation at block 720 may result in one or more retries of block 716, before eventually failing over to block 718. Each retry may occur with respect to a different manager 140 of the reserved capacity arc (e.g., a next in a round robin rotation). Similarly, implementation of block 718 may be retried one or more times if a manager 140 of the general arc does not return an environment.

The routine 700 then proceeds to block 724, where the frontend 120 causes the environment to execute the task (similarly to block 516 of FIG. 5). The routine 700 then ends at block 726. Accordingly, like the routine 500, execution of the routine 700 enables the frontend 120 to route calls to execute both tasks associated with reserved capacity and tasks not associated with reserved capacity, in a manner that enables load balancing among managers 140 while still providing distributing calls in a manner that increases the probability that a pre-warmed environment for the call can be located. Moreover, the routine 700 further reduces the probability of incurring cold starts under conditions where reserved capacity is reduced, but load on a task is steady.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An on-demand code execution system comprising:
    a set of computing devices implementing a pool of execution environments for the on-demand code execution system, the pool comprising:
        a first set of execution environments reserved for execution of a first task on the on-demand code execution system, the task corresponding to code executable to implement desired functionality on the on-demand code execution system, wherein each environment within the first set is provisioned with software required to execute the code of the task, and wherein a number of environments within the first set is maintained is accordance with a reservation limit of the task; and a second set of execution environments supporting execution of one or more other tasks on the on-demand code execution system;

wherein the environments of the pool are distributed among the set of computing devices; and a frontend computing device configured to maintain:

a consistent hash ring data structure facilitating distribution of calls among the set of computing devices;

information identifying a first arc of the consistent hash ring data structure, the first arc comprising a first subset of computing devices from the set of computing devices identified according to a hash value corresponding to the first task and the reservation limit of the first task;

information identifying a second arc of the consistent hash ring data structure, the second arc comprising a second subset of computing devices from the set of computing devices identified according to a hash value corresponding to the one or more other tasks;

wherein the frontend computing device is further configured to:

obtain a call to execute a requested task;

when the requested task corresponds to the first task:

select a computing device from the first arc from which to request an execution environment of the first set of execution environments reserved for execution of the first task; and instruct the execution environment of the first set of execution environments to execute the first task; and when the requested task corresponds to a task of the one or more other tasks:

select a computing device from the second arc from which to request an execution environment of the second set of execution environments; and instruct the execution environment of the second set of execution environments to execute the requested task.

2. The system of claim 1, wherein the frontend computing device is a first frontend computing device, and wherein the system further comprises a plurality of additional frontend computing devices matching a configuration of the first frontend computing device.

3. The system of claim 1, wherein a number of computing devices within the second subset is set according to a volume of calls corresponding to the second arc.

4. The system of claim 3 further comprising one or more computing devices implementing a counting service configured to maintain information indicating the volume of calls corresponding to the second arc.

5. The system of claim 1, wherein the frontend is further configured, when the requested task corresponds to the first task, to:

detecting that a number of concurrent executions of the first task on the on-demand code execution system exceeds the reservation limit of the task; and detecting that a proportion of the first set of execution environments that are currently executing the first task relative to the number of environments within the first set falls below a threshold proportion;

wherein selection of the computing device from the first arc is responsive to detecting both that the number of concurrent executions of the first task on the on-demand code execution system exceeds the reservation limit of the task and that the proportion falls below the threshold proportion.

6. A computer-implemented method comprising:

implementing a consistent hash ring facilitating distribution of calls among a set of computing devices distributively managing a pool of execution environments for an on-demand code execution system the pool comprising:

a first set of execution environments reserved for execution of a first task on the on-demand code execution system, the task corresponding to code executable to implement desired functionality on the on-demand code execution system, wherein a number of environments within the first set is maintained is accordance with a reservation limit of the first task; and a second set of execution environments supporting execution of one or more other tasks on the on-demand code execution system;

generating data identifying a first arc of the consistent hash ring, the first arc comprising a first subset of computing devices from the set of computing devices identified according to a hash value corresponding to the first task and the reservation limit of the task;

generating data identifying a second arc of the consistent hash ring, the second arc comprising a second subset of computing devices from the set of computing devices identified according to a hash value corresponding to the one or more other tasks;

obtaining a call to execute a requested task;

identifying an arc for the call based at least in part on a hash value corresponding to an identifier associated with the requested task, the identified arc corresponding to the first arc or the second arc;

selecting a computing device from the identified arc from which to request an execution environment in which to execute the requested task; and executing the requested task within an execution environment provided by the selected computing device.

7. The method of claim 6, wherein the hash value corresponding to the first task is an output of a hash function applied to an identifier of the first task, and wherein the hash value corresponding to the one or more other tasks is an output of the hash function applied to an identifier of an account associated with the one or more other tasks.

8. The method of claim 6 further comprising:

incrementing a counter for the identified arc, the counter indicating a number of concurrent executions on the on-demand code execution environment associated with the identified arc; and verifying, prior to selecting the computing device from the identified arc, that a number of concurrent executions on the on-demand code execution environment associated with the identified arc does not exceed a supported concurrency level for the identified arc.

9. The method of claim 8, wherein the supported concurrency level for the first arc is equal to the reservation limit of the first task, and wherein the supported concurrency level for the second arc is set according to a past volume of calls associated with the second arc.

10. The method of claim 6, wherein the identified arc is the first arc, the method further comprising:

incrementing a counter for the identified arc, the counter indicating a number of concurrent executions on the on-demand code execution environment associated with the identified arc;

determining that the number of concurrent executions on the on-demand code execution environment associated with the identified arc exceeds a supported concurrency level for the identified arc; and detecting that a proportion of the first set of execution environments that are currently executing the first task relative to the number of environments within the first set falls below a threshold proportion; and wherein selection of the computing device from the first arc is responsive to detecting both that the number of concurrent executions of the first task on the on-demand code execution system exceeds the reservation limit of the task and that the proportion falls below the threshold proportion.

11. The method of claim 9 further comprising transmitting the request for the execution environment to the selected computing device, the request indicating that the selected computing device should provide the execution environment without expanding the first set of execution environments.

12. The method of claim 6, wherein selecting the computing device from the identified arc comprises implementing a round robin selection on the identified arc.

13. The method of claim 6, wherein each computing device of the first subset is configured with a maximum number of execution environments supportable for an individual arc, and wherein a number of computing devices within the first subset is determined based on dividing the reservation limit of the task by the maximum number of execution environments supportable for an individual arc by each computing device.

14. Non-transitory computer-readable media comprising computer executable instructions that, when executed by a frontend device of an on-demand code execution system, cause the frontend device to:

generate data identifying a first arc of a consistent hash ring that facilitates distribution of calls among a set of computing devices distributively managing a pool of execution environments for an on-demand code execution system, the first arc comprising a first subset of computing devices from the set of computing devices identified according to a hash value corresponding to a first task, wherein the first subset of computing device maintain a first set of execution environments reserved for execution of the first task, and wherein a number of environments within the first set is maintained is accordance with a reservation limit of the first task;

generate data identifying a second arc of the consistent hash ring, the second arc comprising a second subset of computing devices from the set of computing devices identified according to a hash value corresponding to one or more other tasks, wherein the second subset of computing device maintain a second set of execution environments supporting execution of the one or more other tasks on the on-demand code execution system;

obtain a call to execute a requested task;

identify an arc for the call based at least in part on a hash value corresponding to an identifier associated with the requested task, the identified arc corresponding to the first arc or the second arc;

select a computing device from the identified arc from which to request an execution environment in which to execute the requested task; and execute the requested task within an execution environment provided by the selected computing device.

15. The non-transitory computer-readable media of claim 14, wherein the request task is the first task, wherein the first set of execution environments are provisioned with software required to execute the first task, and wherein execution of the requested task within the execution environment comprises executing the requested task without provisioning the execution environment responsive to call.

16. The non-transitory computer-readable media of claim 14, wherein the instructions cause the frontend to select the computing device from the identified arc utilizing round robin selection.

17. The non-transitory computer-readable media of claim 14, wherein the instructions further cause the frontend to:

increment a counter for the identified arc, the counter indicating a number of concurrent executions on the on-demand code execution environment associated with the identified arc; and verify, prior to selecting the computing device from the identified arc, that a number of concurrent executions on the on-demand code execution environment associated with the identified arc does not exceed a supported concurrency level for the identified arc.

18. The non-transitory computer-readable media of claim 17, wherein the supported concurrency level for the first arc is equal to the reservation limit of the first task, and wherein the supported concurrency level for the second arc is set according to a past volume of calls associated with the second arc.

19. The non-transitory computer-readable media of claim 14, wherein the instructions further cause the frontend to:

increment a counter for the identified arc, the counter indicating a number of concurrent executions on the on-demand code execution environment associated with the identified arc;

determine that the number of concurrent executions on the on-demand code execution environment associated with the identified arc exceeds a supported concurrency level for the identified arc; and detect that a proportion of the first set of execution environments that are currently executing the first task relative to the number of environments within the first set falls below a threshold proportion; and wherein selection of the computing device from the first arc is responsive to detecting both that the number of concurrent executions of the first task on the on-demand code execution system exceeds the reservation limit of the task and that the proportion falls below the threshold proportion.

20. The non-transitory computer-readable media of claim 14, wherein the instructions further cause the frontend to transmit the request for the execution environment to the selected computing device, the request indicating that the selected computing device should provide the execution environment without expanding the first set of execution environments.

* * * * *